United States Patent
Johnson et al.

(10) Patent No.: US 10,451,019 B2
(45) Date of Patent: Oct. 22, 2019

(54) STARTER DEVICE FOR A PRIME MOVER

(71) Applicant: Caterpillar Inc., Peoria, IL (US)

(72) Inventors: Terril James Johnson, Washington, IL (US); Gregory Hubbel Gipp, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 532 days.

(21) Appl. No.: 14/795,662

(22) Filed: Jul. 9, 2015

(65) Prior Publication Data

US 2017/0009726 A1  Jan. 12, 2017

(51) Int. Cl.
| | |
|---|---|
| *F02N 11/08* | (2006.01) |
| *E02F 3/88* | (2006.01) |
| *B60R 25/23* | (2013.01) |
| *F02D 41/22* | (2006.01) |

(52) U.S. Cl.
CPC .......... *F02N 11/0803* (2013.01); *B60R 25/23* (2013.01); *E02F 3/8883* (2013.01); *F02D 2041/228* (2013.01)

(58) Field of Classification Search
CPC ........ F02D 29/02; F02D 41/062; F02D 41/22; F02D 29/00; F02D 2041/228; F02D 11/02; F02N 11/101; F02N 11/0803; F02N 11/08; B60R 25/23; B60R 25/24; B60R 25/25

See application file for complete search history.

(56) References Cited

U.S. PATENT DOCUMENTS

| | | | | |
|---|---|---|---|---|
| 4,673,914 A | * | 6/1987 | Lee ........................ | B60R 25/045 180/287 |
| 7,091,629 B2 | * | 8/2006 | Hawkins ............. | F02N 11/0803 123/179.4 |
| 8,414,455 B2 | * | 4/2013 | McCullough ........... | B60R 25/02 477/106 |

(Continued)

FOREIGN PATENT DOCUMENTS

| | | |
|---|---|---|
| JP | 2006040606 A | 2/2006 |
| JP | 2010012921 A | 1/2010 |

(Continued)

OTHER PUBLICATIONS

Automatic shutdown when idle—Windows XP Security & Administration.pdf.*

(Continued)

*Primary Examiner* — Carl C Staubach
(74) *Attorney, Agent, or Firm* — Miller, Matthias & Hull

(57) ABSTRACT

A starter device for a work machine may include a ring switch surrounding a housing. The ring switch may be rotatable between a first ring position and a second ring position. A push button may be surrounded by the housing and may be operatively engageable between a first button position and a second button position within the housing. A controller may be in communication with the ring switch and the push button. The controller may be configured to start a prime mover of the work machine when the ring switch is in the second ring position and the push button is operatively engaged from the first button position to the second button position. The controller may be configured to stop the prime mover using delayed shutdown when the ring switch is rotated from the second ring position to the first ring position.

7 Claims, 6 Drawing Sheets

(56) References Cited

U.S. PATENT DOCUMENTS

| | | | |
|---|---|---|---|
| 8,525,368 B2* | 9/2013 | Perhats, Sr. | H02J 9/002 307/10.6 |
| 8,810,363 B2* | 8/2014 | Sakamoto | B60R 25/04 180/279 |
| 9,002,586 B2* | 4/2015 | Feit | B60R 25/252 340/5.53 |
| 9,080,736 B1* | 7/2015 | Salzinger | H05B 37/0218 |
| 9,147,532 B2* | 9/2015 | Meftah | H01H 3/022 |
| 9,181,864 B2* | 11/2015 | Lank | F02M 37/0011 |
| 9,543,089 B2* | 1/2017 | Kirita | H01H 13/52 |
| 9,624,890 B2* | 4/2017 | Koenen | F02N 11/0803 |
| 2004/0262995 A1* | 12/2004 | Hawkins | F02N 11/0803 307/10.6 |
| 2006/0054124 A1* | 3/2006 | Ono | F02P 11/04 123/179.3 |
| 2006/0054125 A1* | 3/2006 | Ono | F02D 11/02 123/179.3 |
| 2010/0030456 A1* | 2/2010 | Chominsky | F02D 41/08 701/112 |
| 2010/0199949 A1* | 8/2010 | Tamura | A01G 3/047 123/334 |
| 2010/0206278 A1* | 8/2010 | Emmerich | F01M 3/00 123/65 R |
| 2010/0323592 A1* | 12/2010 | Nemetz | B23D 45/16 451/353 |
| 2014/0022707 A1 | 1/2014 | Westlund et al. | |
| 2014/0156149 A1* | 6/2014 | Feit | B60R 25/252 701/49 |

FOREIGN PATENT DOCUMENTS

| | | |
|---|---|---|
| JP | 04712536 B2 | 6/2011 |
| KR | 1020110047734 | 5/2011 |

OTHER PUBLICATIONS

Auto Shutdown When Desktop is idle for 2 hours_.pdf.*

DailyTech—NHTSA Proposes Standardized _Emergency Stop_ Push Button Ignition Timing 2011.*

* cited by examiner

STARTER DEVICE FOR A PRIME MOVER

TECHNICAL FIELD

The present disclosure relates generally to a work machine and, more particularly, to a starter device for a prime mover of such a work machine.

BACKGROUND

Some vehicles no longer require a traditional key to start the engine and, instead, utilize a push-to-start button as a convenient approach to start the engine. For example, in some automotive vehicles, the brake pedal must be engaged or pressed down while the push-to-start button is pushed in order to crank the engine. In such vehicles, if the push-to-start button is initially pushed without the brake pedal being engaged at the same time, then only the accessory or electronics of the vehicle will be turned on while the engine remains off. While effective for automotive vehicles, other vehicles that are without brake pedals such as, but not limited to, some vehicles in the earth-moving, construction, and agricultural industries are limited from implementing such push-to-start buttons to start the engine.

Japanese Patent Publication No. JP2010012921A (the '921 publication) discloses an engine starting device for starting an engine. The engine starting device includes a rotation knob that is rotatable between three positions which include a lock position, an accessory (ACC) position, and an on position. The engine starting device also includes a start button. The engine is started by rotating the rotation knob to the on position and pushing the start button while also engaging the brake pedal. The '921 publication does not disclose a brake-independent starting device for an engine.

While arguably effective for its intended purpose, it can be seen that a need still exists for a push-to-start feature on machines not having a brake pedal or when it is desired to not use the brake pedal as part of the starter sequence.

SUMMARY

In accordance with an aspect of the disclosure, a starter device for a work machine is provided. The starter device may include a ring switch surrounding a housing. The ring switch may be rotatable between a first ring position and a second ring position. A push button may be surrounded by the housing and may be operatively engageable between a first button position and a second button position within the housing. A controller may be in communication with the ring switch and the push button. The controller may be configured to start a prime mover of the work machine when the ring switch is in the second ring position and the push button is operatively engaged from the first button position to the second button position. The controller may be configured to stop the prime mover using delayed shutdown when the ring switch is rotated from the second ring position to the first ring position.

In accordance with another aspect of the disclosure, a method for starting and stopping a prime mover of a work machine is provided. The method may include powering on a controller when a ring switch is rotated from a first ring position to a second ring position. Another step may entail authenticating an authentication input received from an input device. A further step may include starting the prime mover when the authentication input is determined to be correct, the ring is in the second ring position, and a push button is engaged. An even further step may include stopping the prime mover when the ring switch is rotated from the second ring position to the first ring position.

In accordance with yet another aspect of the disclosure, a method for saving power of a work machine is provided. The method may include powering on a controller when a ring switch is rotated from a first ring position to a second ring position. Another step may entail authenticating an authentication input received from an input device. A further step may be powering on an operator station of the work machine when the authentication input is determined to be correct. Yet another step may be powering off the operator station and the controller when a predetermined time has elapsed and a push button is unengaged.

These and other aspects and features of the present disclosure will be better understood upon reading the following detailed description when taken in conjunction with the accompanying drawings.

DETAILED DESCRIPTION

Figure 1:
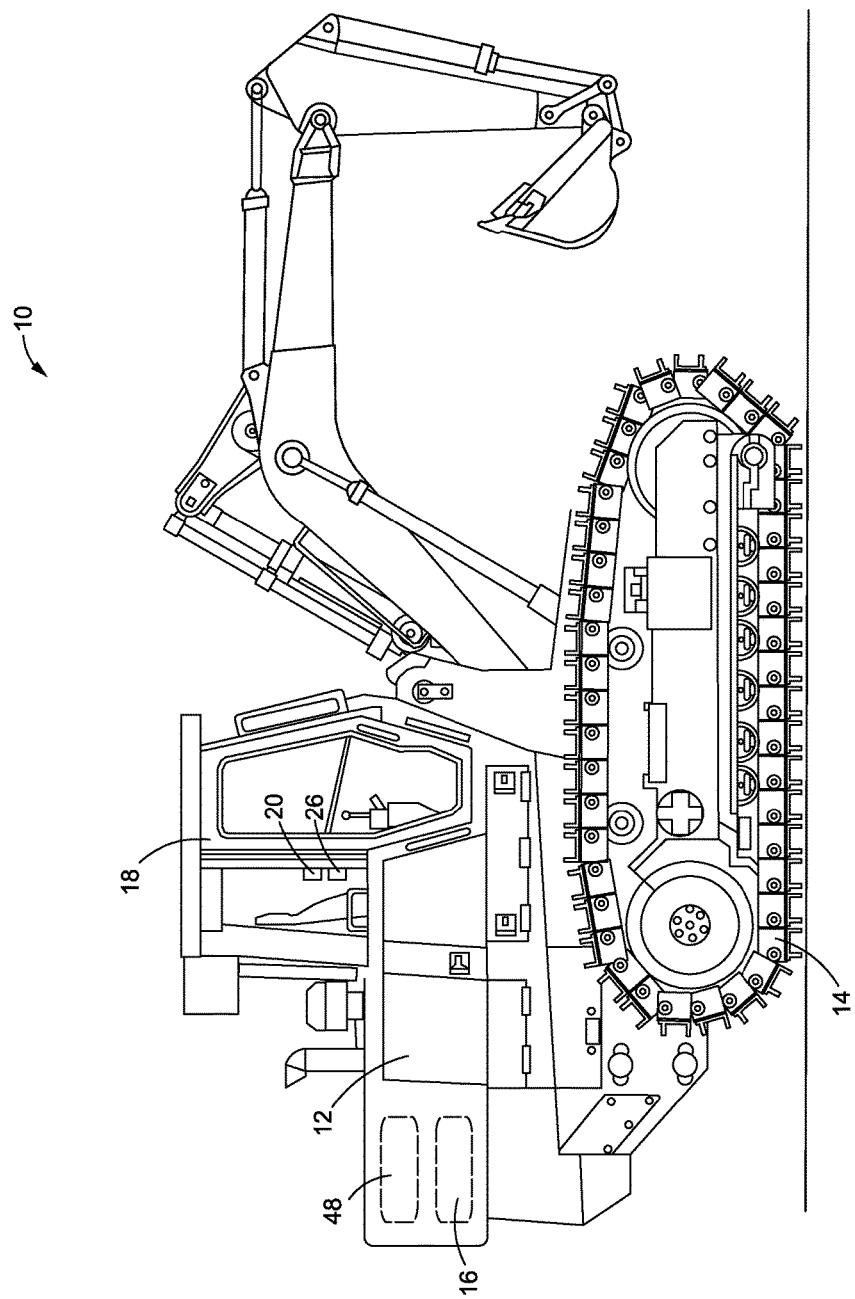
FIG. 1 is a side view of an exemplary work machine, in accordance with an embodiment of the present disclosure.

Referring now to FIG. 1, an exemplary work machine constructed in accordance with the present disclosure is generally referred to by reference numeral 10. The work machine 10 may be any type of work machine well known in the earth-moving, construction, and agricultural industries such as, but not limited to, excavators, backhoes, wheel loaders, motor graders, agricultural tractors, and large mining trucks. The work machine 10 may include a body 12 supported by a plurality of ground engaging elements 14. As non-limiting examples, the plurality of ground engaging elements 14 may be tires or tracks. A prime mover 16 may be disposed in the body 12 and may supply power to the plurality of ground engaging elements 14 for propelling the work machine 10. The prime mover 16 may be, but is not limited to, an internal combustion engine, a diesel engine, a natural gas engine, a hybrid engine, or any combination thereof. The body 12 may also include an operator station 18. A starter device 20 for starting and stopping the prime mover 16 may be disposed in the operator station 18. The starter device 20 may also turn on and turn off power to the operator station 18.

Figure 2:
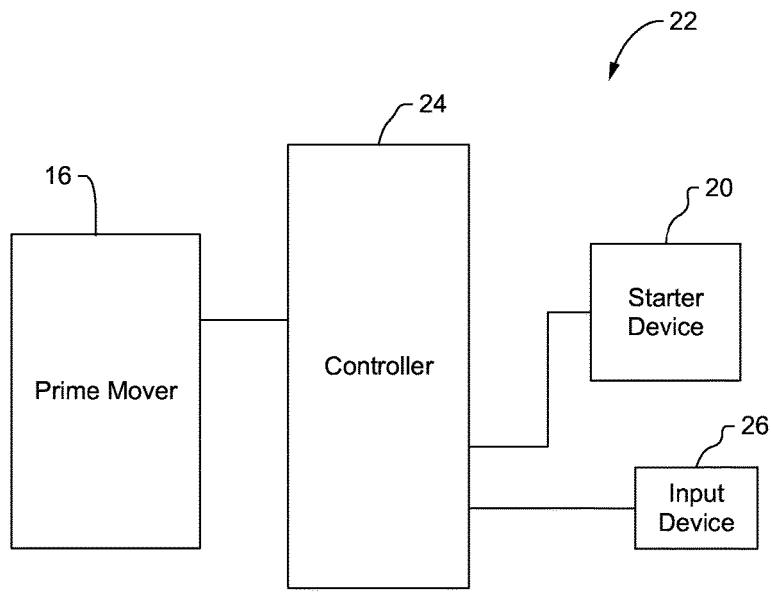
FIG. 2 is a schematic diagram illustrating an exemplary starter system, in accordance with an embodiment of the present disclosure.

As shown in FIG. 2, the starter device 20 may be part of an overall starter system 22 of the work machine 10. The starter system 22 may include a controller 24 in communication with an input device 26 and the starter device 20. The controller 24 may be in communication with the prime mover 16 to control the starting and stopping of the prime mover 16 via signals from the starter device 20. The controller 24 may also be in communication with the operator station 18 to control power being supplied thereto via signals from the starter device 20. The controller 24 may be any type of computer processor, that is well known in the industry, and may be implemented by one or more microprocessors from any desired family or manufacturer. The computer processor may include an internal memory and may be in communication with an external memory such as a database or server. The computer processor may be implemented to execute machine readable instructions stored in such memory. In an embodiment, the input device 26 may be disposed in the operator station 18 so as to receive input from an operator and communicate the input to the controller 24 for authentication to allow starting of the prime mover 16.

Figure 3:
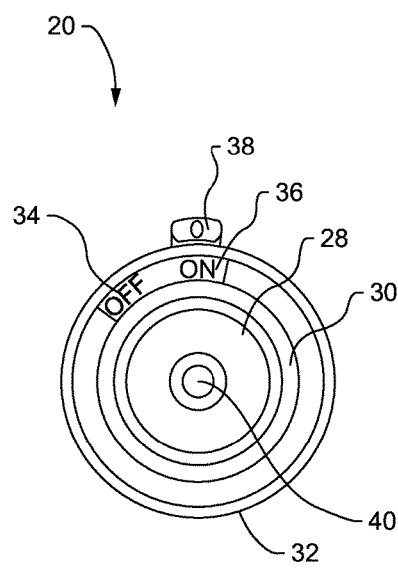
FIG. 3 is a front view of an exemplary starter device, in accordance with an embodiment of the present disclosure.
Figure 4:
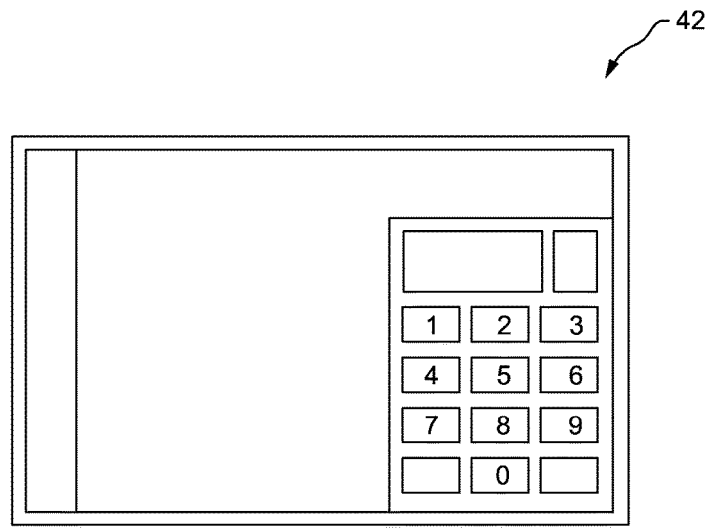
FIG. 4 is a front view of an alternative embodiment of an input device depicted as a touchscreen display, in accordance with an embodiment of the present disclosure.

Referring to FIGS. 3 and 4, the starter device 20 may include a push button 28 surrounded by a housing 30 such that the push button 28 may be engaged or pushed within the housing 30. The push button 28 is axially movable between a first button position (out position) and a second button position (in position). The push button 28 may be biased in the first button position by a biasing member, such as a spring contained within the housing 30. When axially moved to the second button position, the push button 28 will trigger the starting of the prime mover 16. The second button position of the push button 28 may be located at full travel of the push button 28 or along any position between full travel and the first button position. A ring switch 32 may surround the housing 30 and operatively rotate between various positions such as, but not limited to, a first ring position 34 (also referred to as an OFF position) and a second ring position 36 (also referred to as an ON position). A tab 38 or other indicia may protrude from the ring switch 32 to indicate the position of the ring switch 32 being in the first ring position 34 or the second ring position 36. An indicator 40 may be disposed on the outer surface of the push button 28 and may be illuminated by at least one light-emitting diode (LED) or other indicia. While the push button 28 of the starter device 20 is the device used by an operator to initiate ignition of the prime mover 16, for the push button 28 to even be operable, the ring switch 32 must first be positioned to the second ring position 36 and be enabled by the input device 26.

Figures 5, 6:
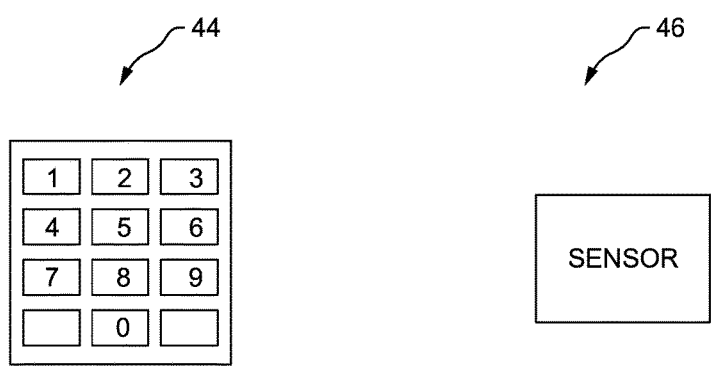
FIG. 5 is a front view of an alternative exemplary embodiment of an input device depicted as a keypad, in accordance with an embodiment of the present disclosure.
FIG. 6 is a diagrammatic view of another alternative exemplary embodiment of an input device depicted as a sensor, in accordance with an embodiment of the present disclosure.

As shown in FIG. 4, in one embodiment, the input device 26 may be a touchscreen 42 such that, for example, an operator may enter an authentication input by touching icons displayed on the touchscreen 42. In an alternative embodiment, depicted in FIG. 5, the input device 26 may be a keypad 44 such that, for example, an operator may enter the authentication input by pressing keys of the keypad 44. In a still further alternative embodiment illustrated in FIG. 6, the input device 26 may be a sensor 46 such as, but not limited to, a fob sensor or other wireless sensor for reading a signal from a key fob, and a biometric sensor for reading a biometric parameter. As an example, the fob sensor 46 may receive the authentication input via a radio frequency communicated from the key fob. In regard to the biometric sensor 46, for example, an operator may position a body part such as, but not limited to, a finger, a palm, a face, and a retina, so that the biometric sensor 46 may identify or read such a physiological characteristic for authentication purposes. Once so identified and authenticated by the input device 26, the starter device 20 is enabled for use as will now be described.

INDUSTRIAL APPLICABILITY

Figure 7:
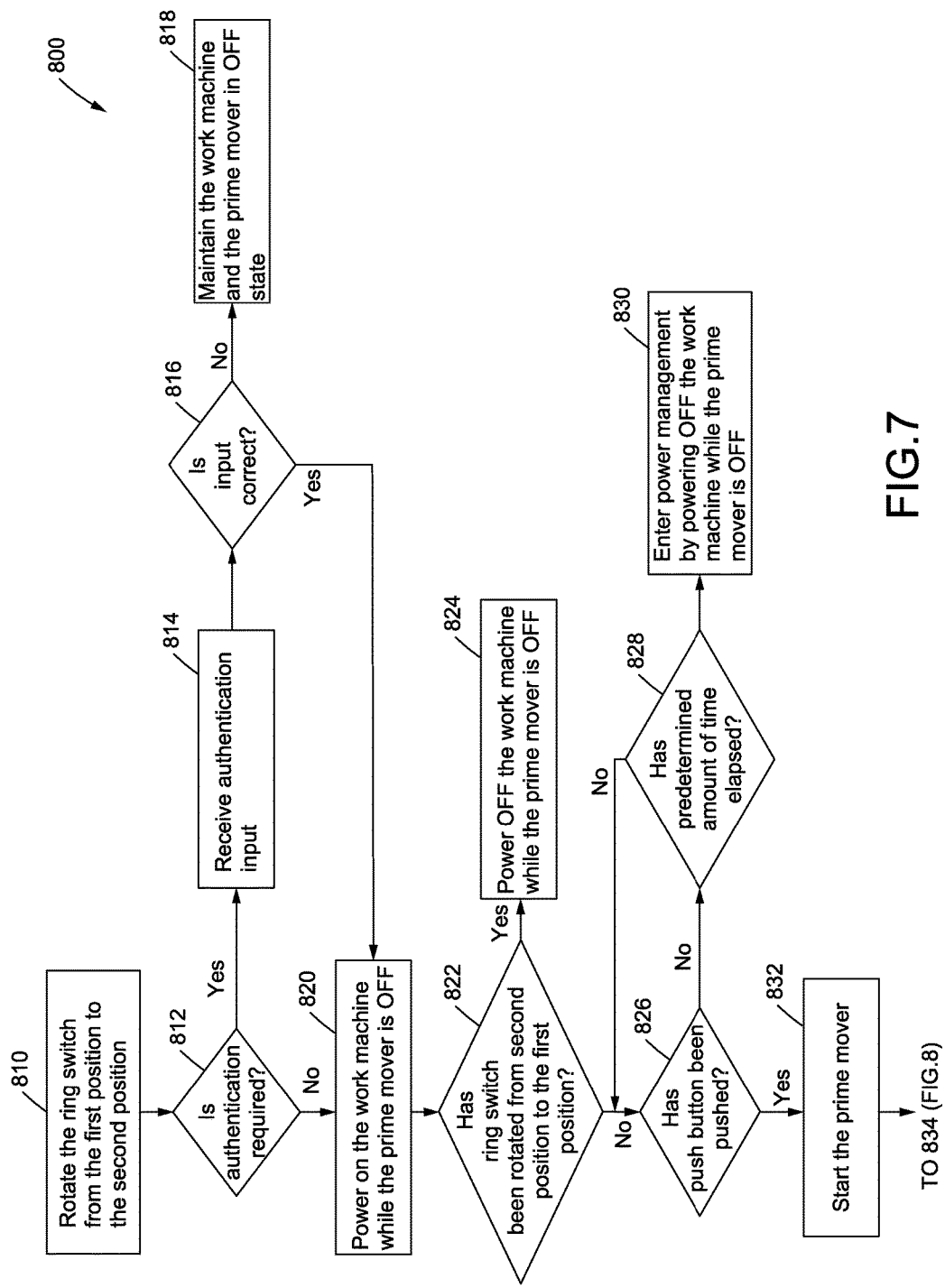
FIGS. 7 and 8 are a flow chart illustrating a sample sequence of steps which may be practiced in accordance with an embodiment of the present disclosure.
Figure 8:
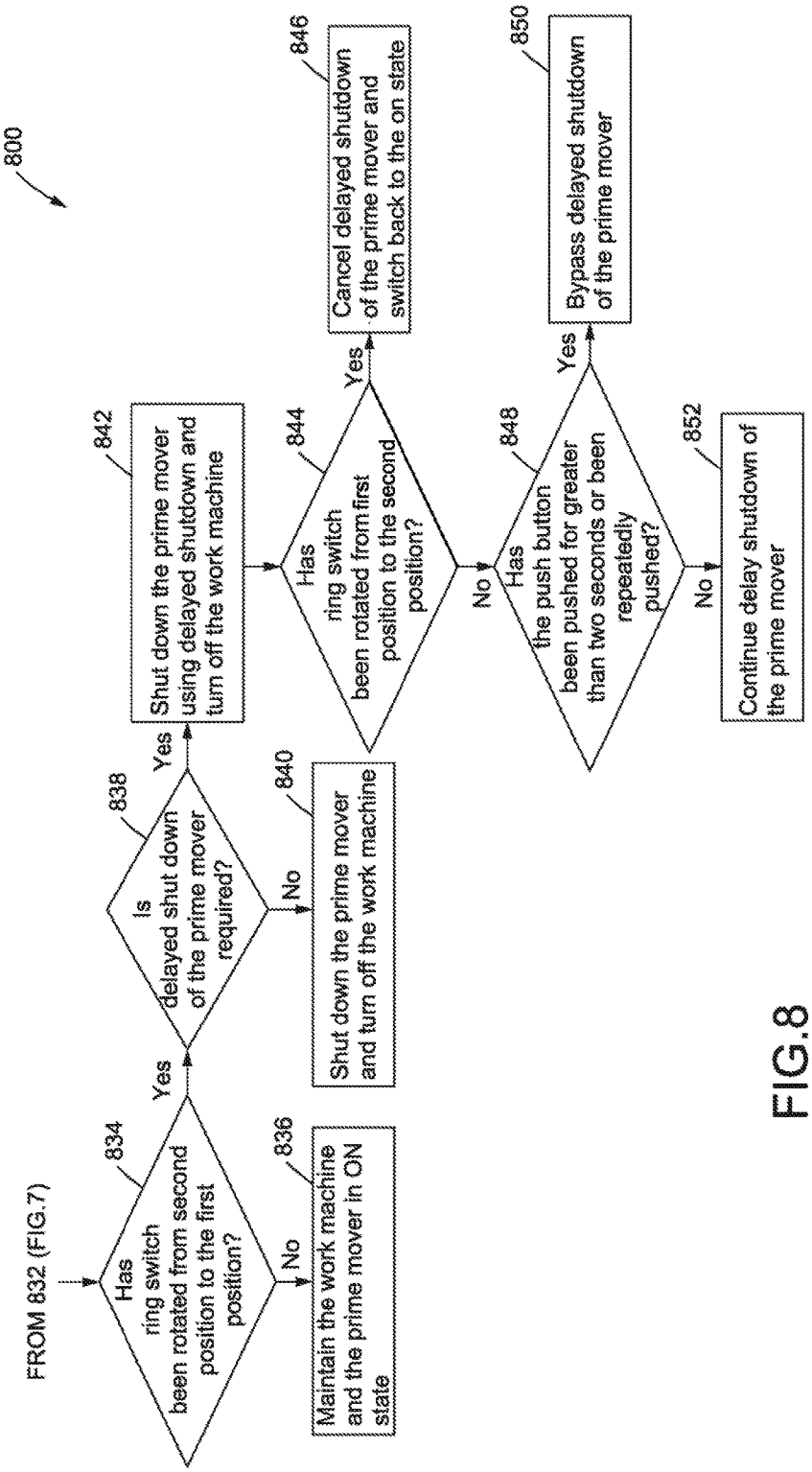

In operation, the starter device 20 may be utilized to start and stop the prime mover 16 and may also be utilized to turn on and off power to the controller 24, and the operator station 18, in a machine not having a brake pedal or when it is desired to not use the brake pedal as part of the starter sequence of the prime mover 16. This will be best understood with reference to the exemplary flow chart 800 depicted in FIGS. 7 and 8 showing a sample sequence of steps which may be practiced in accordance with the present invention. As an added level of detail, the flow chart of FIGS. 7 and 8 is depicted in graphical format in FIG. 9 so that the relative positions of the ring switch 32 is better understood.

Initially, with the ring switch 32 in the first ring position 34 and the push button 28 unengaged, the prime mover 16 and the controller 24 are in an off state with the indicator 40 in an unilluminated state. This is depicted as state 900 of FIG. 9. While the ring switch 32 is in the first ring position 34, engagement of the push button 28, i.e., to the second button position, will result in no action such that the prime mover 16 and the controller 24 remain in the off state. As depicted in box 810 of FIG. 7, the ring switch 32 is rotated from the first ring position 34 to the second ring position 36 so that the controller 24 is powered on. The controller 24 then continues to determine, as illustrated in decision box 812, whether authentication is required. The indicator 40 may illuminate a first color such as, for example, red to indicate that authentication is required. The controller 24 may then receive authentication input via the input device 26, as illustrated in box 814 and state 902. At decision box 816, the controller 24 determines whether the authentication input is correct. If the authentication input is incorrect, as depicted in box 818, then the prime mover 16 and the operator station 18 of the work machine 10 remain off.

Figure 9:
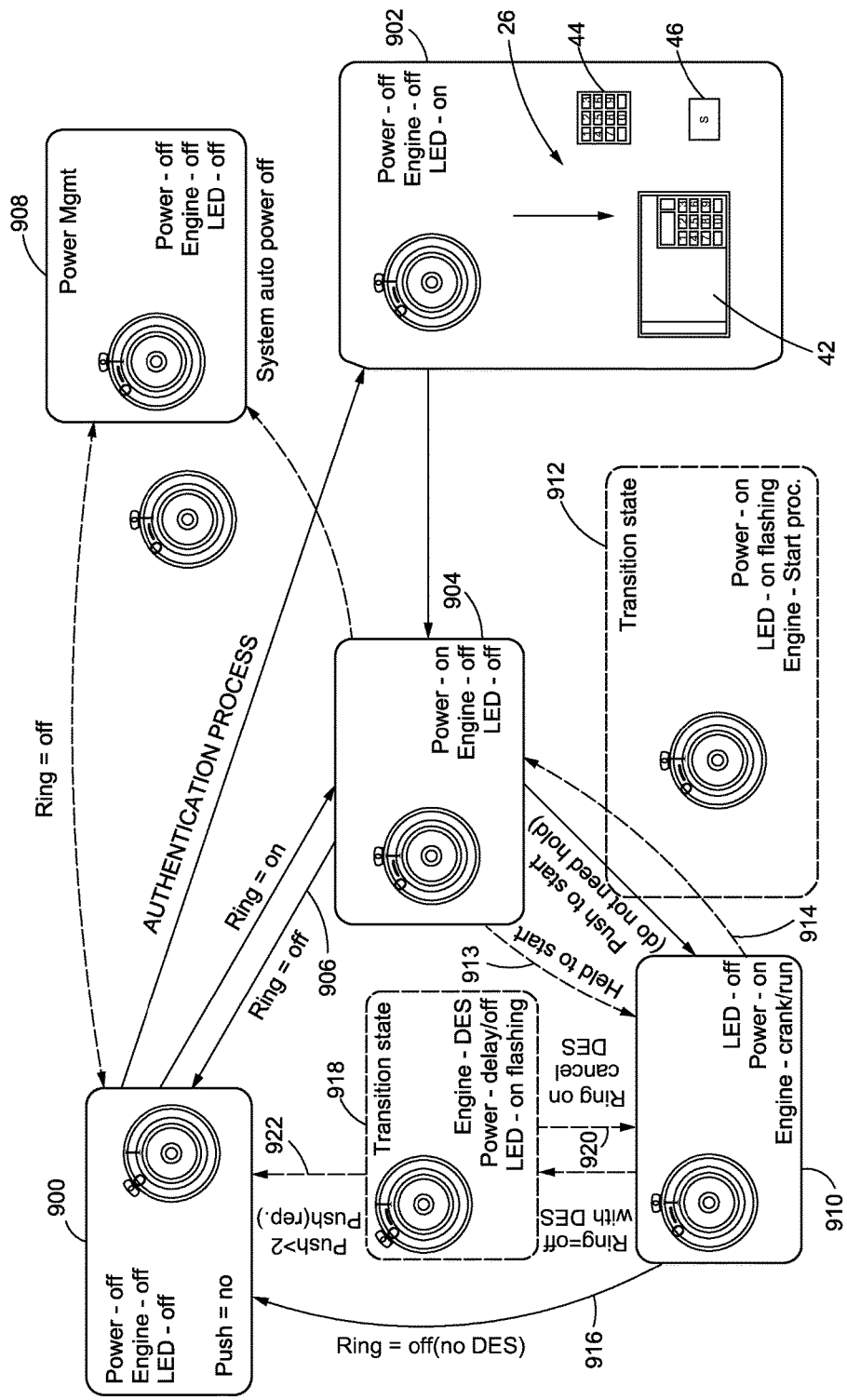
FIG. 9 is a graphical representation illustrating various rotational positioning of an exemplary ring switch and corresponding functions, in accordance with an embodiment of the present disclosure.

On the other hand, as illustrated in box 820, if the authentication input is correct, then the controller 24 powers on the operator station 18 of the work machine 10 (sometimes referred to as cab-on) while the prime mover 16 remains in the power off state as reflected in state 904 of FIG. 9. The indicator 40 may be illuminated a second color such as, for example, green to indicate that the operator station 18 is powered on. Similarly, the controller 24 powers on the operator station 18, while the prime mover 16 remains in the power off state, and may illuminate the indicator 40 the second color when the controller 24 determines, at box 812, that authentication is not required.

Moving to decision box 822, the controller 24 determines whether the ring switch 32 has been rotated from the second ring position 36 to the first ring position 34. If the ring switch 32 has been rotated from the second ring position 36 to the first ring position 34, the controller 24 and the operator station 18 are powered off and the indicator 40 may be unilluminated, as depicted in box 824 and at line 906 in FIG. 9. If the ring switch 32 has not been rotated from the second ring position 36 to the first ring position 34, the controller 24 determines, as illustrated at decision box 826, whether the push button 28 has been engaged or pushed.

When the controller 24 determines that the push button 28 has not been engaged the controller 24 will determine, as depicted in decision box 828, whether a predetermined time has elapsed. If the predetermined time has elapsed, then a power management state 908, as depicted in FIG. 9, is entered into such that the controller 24 and the operator station 18 are powered off and the indicator 40 may be unilluminated, while the prime mover 16 remains powered off, as illustrated in box 830. As an example of one embodiment, in the power management state 908, although the ring switch 32 may remain in the second ring position 36, the controller 24, the operator station 18, and the prime mover 16 are all in the power off state. If the predetermined time has not elapsed, the controller 24 may continue to determine whether the push button 28 has been engaged, as depicted by the loop back to decision box 826.

When the controller 24 determines that the push button 28 has been engaged (without holding down the push button 28), at decision box 826 in FIG. 7, the starting process of the prime mover 16 begins, as illustrated at box 832 and state 910 in FIG. 9. As the prime mover 16 is transitioning through the starting process into an on (run) state, as depicted at state 912, the indicator 40 may flash in the second color. As an example, the indicator 40 may flash the second color such that the indicator 40 alternates from being illuminated for 1 second and unilluminated for 1 second. In an alternative embodiment, as depicted by dotted line 913, state 912 may be bypassed such that the push button 28 may be engaged and held in the second button position to begin the start process of the prime mover 16 during which time the indicator 40 may remain illuminated in the second color. In an embodiment, if the ring switch 32 is rotated from the second ring position 36 to the first ring position 34 during this transition state (before the prime mover 16 is in the on state), the prime mover 16 may enter an auto shutdown process to shut down the prime mover 16, as depicted at dotted line 914 in FIG. 9. Once the prime mover 16 is in the on state, the indicator 40 may be unilluminated, illuminated in the second color, or dimly illuminated in the second color. While the prime mover 16 is in the on state, engagement of the push button 28 may illuminate the indicator 40 in the first color to indicate an unauthorized action and will result in no further actions such that the prime mover 16 remains in the on state and the controller 24 and the operator station 18 also remain powered on.

As illustrated at decision box 834, with the prime mover 16 in the on state, the controller 24 determines whether the ring switch 32 has been rotated from the second ring position 36 to the first ring position 34. If the ring switch 32 has not been rotated from the second ring position 36 to the first ring position 34, as illustrated in box 836, the prime mover 16 remains in the on state and the controller 24 and the operator station 18 also remain powered on. If, on the other hand, the controller 24 determines that the ring switch 32 has been rotated from the second ring position 36 to the first ring position 34, the controller 24 will determine, as illustrated in decision box 838, whether a delayed shutdown of the prime mover 16 is required. If the controller determines that delayed shutdown of the prime mover 16 is not required, as illustrated in box 840, the prime mover 16 shuts down to an off state and the controller 24 and the operator station 18 are powered off, as depicted at line 916 in FIG. 9. At this time, the indicator 40 may be unilluminated to indicate that the prime mover 16 and the controller 24 are in the off state. If the controller 24 determines, at decision box 838, that delayed shutdown of the prime mover 16 is required, the prime mover 16 is shut down utilizing delayed shutdown, as illustrated in box 842 and as explained in more detail below.

As an example, the prime mover 16 may include an after treatment system. The after treatment system may include a catalytic converter 48, which requires a cooling down process before the prime mover 16 is shut down to the off state. As such, during delayed shutdown of the prime mover 16, the prime mover 16 does not immediately shut down to the off state, but instead, continues to run for the duration of the cool down process and then shuts down to the off state.

During delayed shutdown of the prime mover 16, the indicator 40 may flash the second color, such that the indicator 40 alternates from being illuminated for 1 second and unilluminated for 1 second, until completion of the delayed shutdown of the prime mover 16, as depicted at state 918 in FIG. 9. If the controller 24 determines, during delayed shutdown, that the ring switch 32 has been rotated back to the second ring position 36 from the first ring position 34, as illustrated in decision box 844 in FIG. 8 and at dotted line 920 in FIG. 9, the delayed shutdown is canceled and the prime mover 16 will switch back to the on state and the indicator 40 may be unilluminated, as illustrated in box 846. If the controller 24 determines, at decision box 844, that the ring switch 32 has not been rotated from the first ring position 34 to the second ring position 36, delayed shutdown of the prime mover 16 continues and the controller 24 determines, as illustrated in decision box 848, whether the push button 28 has been pushed and held in for greater than a predetermined time, such as 2 seconds, or repeatedly pushed. If the controller 24 determines that this condition has been satisfied, delayed shutdown of the prime mover 16 is bypassed and the prime mover 16 is immediately shut down, as illustrated at box 850 in FIG. 8 and at dotted line 922 in FIG. 9. If the controller 24 determines that the push button 28 has neither been pushed and held in for greater than the predetermined time nor repeatedly pushed, delayed shutdown of the prime mover 16 continues until completion such that the prime mover 16 arrives to the off state and the controller 24 is powered off, as illustrated at box 852. At this time, the indicator 40 may be unilluminated to indicate that the prime mover 16 and the controller 24 are in the off state.

Based on the foregoing, it can be seen that the present disclosure sets forth systems and methods for starting and stopping a prime mover of a work machine. For example, when the ring switch 32 has been rotated from the first ring position 34 to the second ring position 36 and the controller 24 determines the authentication input is correct, pushing the push button 28 starts the prime mover 16. In contrast to traditional push-to-start buttons which require the engagement of a brake pedal in conjunction with engagement of the push-to-start button in order to start the prime mover, the starter device 20 of the present disclosure starts the prime mover 16, independently of engagement of a brake pedal, when the push button 28 is engaged. In fact, the starter device 20 of the present disclosure will operate accordingly, as described above, even in a work machine 10 without a brake pedal.

Furthermore, through the novel teachings set forth above, on some work machines 10, when the prime mover 16 is running and the ring switch 32 is rotated from the second ring position 36 to the first ring position 34, the starter device 20 may utilize the delayed shutdown process of the prime mover 16 such that the prime mover 16 continues running for a period of time before stopping in order to allow the catalytic converter 48 of the work machine 10 to properly cool down.

The teachings of this disclosure may also be employed to also allow for power savings of the work machine 10 by powering off the operator station 18 and the controller 24 when a predetermined time has elapsed and the push button 28 has not been engaged.

What is claimed is:

1. A method for starting and stopping a prime mover of a work machine, the method comprising:
    powering on a controller when a ring switch is rotated from a first ring position to a second ring position;
    authenticating an authentication input received from an input device;
    starting the prime mover independently from engagement of a brake pedal of the work machine when the authentication input is determined to be correct, the ring switch is in the second ring position, and a push button is engaged;
    determining, by the controller, when the ring switch is rotated from the second ring position to the first ring position, whether to stop the prime mover immediately or to stop the prime mover using a delayed shutdown procedure;
    beginning the prime mover delayed shutdown procedure, such that the prime mover continues running for a period of time before stopping; and
    bypassing the delayed shut down procedure and stopping the prime mover immediately when the push button is engaged for a predetermined period of time.

2. The method of claim 1, wherein the authenticating step involves indicating a request for an authentication input.

3. The method of claim 1, further including powering on an operator station of the work machine when the authentication input is determined to be correct.

4. The method of claim 1, wherein the authenticating step further includes indicating the authentication input is determined to be correct.

5. The method of claim 1, wherein the delayed shutdown step further includes cooling a catalytic converter of the work machine.

6. The method of claim 1, wherein the bypassing step further includes bypassing the delayed shutdown procedure and stopping the prime mover immediately when the push button is engaged repeatedly.

7. The method of claim 1, wherein the delayed shutdown step further includes indicating the prime mover is in the delayed shutdown process.

* * * * *